Feb. 28, 1961 J. S. COURTNEY-PRATT 2,973,441

DEVICES EMPLOYING SUPERCONDUCTIVE MATERIAL

Filed Sept. 18, 1959

INVENTOR
J. S. COURTNEY-PRATT
BY
H. O. Wright
ATTORNEY 2,973,441

DEVICES EMPLOYING SUPERCONDUCTIVE MATERIAL

Jeofry S. Courtney-Pratt, Springfield, N.J., assignor to Bell Telephone Laboratories, Incorporated, New York, N.Y., a corporation of New York Filed Sept. 18, 1959, Ser. No. 840,927

12 Claims. (Cl. 307—88.5)

This invention relates to electrical devices which utilize the property of superconductivity.

Numerous elements and compounds are known to have the property of becoming "superconductive," that is, the electrical resistance of the material becomes zero if it is cooled to or below a specific transition temperature. The transition temperature required to produce superconductivity may be considerably different for different materials. Immediately upon raising the temperature of such a material above the transition temperature its superconductivity is extinguished and the normal properties of the material reappear.

A general discussion of the phenomenon of superconductivity is given, for example, in chapter eleven of Professor Charles Kittel's book entitled "Introduction to Solid State Physics" published by John Wiley and Sons, New York 1953. A list of elements which to that time had been found to become superconductive and the respective transition temperatures at which each material developed the property are given in Table 11.1 on page 207 of the book. Table 11.2 on page 208 of the book gives a similar list of compounds which had been found to become superconductive and the respective temperatures at which the change occurred.

A number of prior art devices have been devised for utilizing the phenomenon of superconductivity. A representative device comprises, for example, a pair of conductive elements connected electrically in parallel, one element becoming superconductive at a predetermined transistion temperature. The other element usually has a higher conductivity above the predetermined transition temperature than the "superconductive" element but has no superconductive properties within the temperature range at which the device is being used. Means for cooling the device to or below its transition temperature and alternatively activated means for heating the device to above that temperature are included. Above the transition temperature a current determined mainly by the resistance of the non-superconductive material flows through the combination. Below the transition temperature the zero resistance of the superconductive material causes a switching of the current to it. The discontinuity introduced by the sudden drop in the resistance of the parallel combination at the temperature at which one element becomes superconductive is then utilized. Repeated heating and cooling of the combination through the predetermined transition temperature is commonly resorted to in order to cause the discontinuity to be periodically or cyclically recurring. As is well known to those skilled in the art, such devices may be used to control oscillatory circuits or they may function as switches, limiters, memory storage devices and the like.

A difficulty encountered with certain prior art devices of this type has been that of obtaining sufficient rapidity in effecting the alternate heating and cooling cycles.

Accordingly, a principal object of the invention is to increase the rapidity with which a device including superconductive and non-superconductive materials can be alternately cooled below and heated above the temperature at which the superconductive property becomes manifest.

Further objects are to facilitate the fabrication of devices combining superconductive and non-superconductive materials and to obtain improved operation.

A still further object is to increase the capabilities of devices employing combinations of superconductive and non-superconductive materials.

In accordance with the principles of the invention the above-mentioned difficulty of the prior art is overcome by subdividing the superconductive material and associating it with the non-superconductive material so that, for example, an electrical current flowing through the device must pass through a number of paths in the non-superconductive material in reaching and/or leaving each subdivided portion of the superconductive material. This manifestly results in a more rapid heating of the assembly by the current to more quickly raise the temperature above the transition temperature.

A heat sink is provided in arrangements of the invention which is in close heat transfer relation with the current paths and the portions of superconductive material. The purpose of the sink is to insure rapid cooling of the combination between successive heating intervals. As will become apparent hereinunder, the heat sink in one simple form can be readily provided by using a suitably large member of the non-superconductive material. Cooling is commonly effected, for example, by enclosing the member including the superconductive material in a Dewar flask in which liquid helium has been placed. Immersing the device in the helium is an alternate way of providing an effective heat sink in addition to the cooling effect since liquid helium is a good heat conductor. Commonly, also, heating is usually effected by passing current through the member. Obviously, any of numerous other heating and cooling means well known and extensively used by those skilled in the art can, however, be adapted for use as the primary means in arrangements of the invention, or as additional means to supplement those above described.

Combinations of the invention also may employ several different superconductive materials in a single combination so that several discontinuities will be exhibited by the combination when the temperature is varied through an appropriate range.

The features and advantages of the invention as well as other and further objects will become apparent from a perusal of the following detailed description of illustrative embodiments of the invention given hereinunder.

Figure 1:
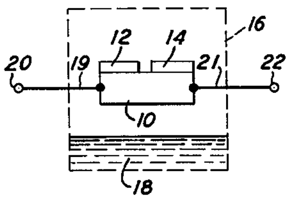
Fig. 1 illustrates a first device of the invention.

In more detail in Fig. 1, a small block 10 of a non-superconductive, electrically-conducting material which is also an efficient heat transferring material such, for example, as copper has two smaller members 12 and 14 of a "superconductive" material such, for example, as lead conductively attached to its upper surface for the efficient transfer of both heat and electricity between block 10 and members 12, 14. As shown, members 12 and 14 are positioned with a small interval between their adjacent edges. The block 10 and members 12 and 14 mounted on it are enclosed in a Dewar flask, represented by the broken line rectangle 16, containing a quantity of liquid helium 18. Conductive leads 19 and 21 are fastened to opposite ends of block 10 and are brought out of flask 16 to make electrical connections at terminals 20 and 22, respectively, as shown. Members 12 and 14 may be of thin strip material soldered to block 10, or they may be vapor-deposited on block 10. The latter process is exemplified, for example, in Patent 2,842,463 granted July 8, 1958 to W. L. Bond and E. M. Kelly.

A typical cycle of operations of a device as illustrated in Fig. 1 will now be described. Assume that in the absence of any voltage across terminals 20 and 22 the cooling effect of the liquid helium 18 is sufficient to cool block 10 and members 12 and 14 below the transition temperature at which members 12 and 14 become superconductive. Accordingly, members 12 and 14 will then have zero resistance.

If a voltage is applied to terminals 20 and 22, current will flow, for example, through a circuit comprising conductor 19 and by the shortest path (or path of least impedance) through block 10 to member 12. The current will next seek the shortest path through block 10 in passing from member 12 to member 14 and again the shortest path from member 14 through block 10 to conductor 21 and terminal 22.

Figure 5:
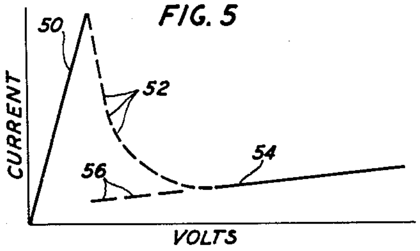
Fig. 5 is a voltage versus current characteristic illustrating the region of negative diffential resistance of a member of the invention.

Referring to Fig. 5, the current will upon application of a sufficient voltage at first rise rapidly to a relatively large value as illustrated, for example, by the nearly vertical line 50. This substantail current flowing through the short paths in block 10, as mentioned above, to reach and leave members 12 and 14 will generate heat in block 10, since block 10 is not superconducting but has retained its usual resistivity. This, obviously, will raise the temperature of those portions of block 10 which are closely adjacent to and contiguous with members 12 and 14 and in turn will raise the temperature of the members 12 and 14 above the transition temperature where they lose the property of being superconductive.

The major portion of the current will then flow directly through block 10 from lead 19 to lead 21 and, in view of the increased resistance of such a path, it will rapidly decrease along a curve such as the broken line 52 of Fig. 5, until it reaches the much lower and more gradually rising characteristic 56, 54, which will be substantially the characteristic of block 10 were members 12 and 14 removed from it. This is so since the resistivity of most superconductive materials such as lead, for example, above the transition temperature is sufficiently greater than that of non-superconductors such as copper to cause most of the current to flow through the latter. If the voltage is then gradually reduced to a value approximating that corresponding to the left end of broken line 56, the current will at first gradually decrease along the path 54, 56 and, because of the relatively large volume of block 10 and its efficient heat transferring properties, the block 10 and members 12, 14 will be cooled rapidly by liquid helium 18 until at some point along the extension 56 of path 54 members 12 and 14 will be cooled to the transition temperature at which they become superconductive. A current jump to line 50 will then occur and if the voltage is further reduced to zero the current will follow line 50 to zero.

Such a cycle obviously includes the three phases represented by paths 50, 52 and 56, 54 of Fig. 5. In the first phase, represented by path 50, elements 12 and 14 are superconductive and the current varies rapidly and in direct proportion to the voltage. In the second phase, represented by path 52, the current varies rapidly but in inverse relation to the voltage. In the third phase as represented by path 56, 54 the current varies slowly and in direct proportion to the voltage.

Of course, for many purposes devices of the invention such, for example, as the type illustrated in Fig. 1 can be biased by a constant potential holding the current at a point near the upper end of line 50 so that, for example, a very small increase in voltage (or temperature) will produce the jump down path 52 or a very small reduction in voltage (or temperature) will produce a jump back to line 50.

In deed, by proper choice of the voltage applied, the voltage can be sufficient to cause the temperature of the superconductive material to rise above its transition temperature but insufficient to prevent the block and superconductive members from thereafter being cooled by the helium 18 to a temperature lower than its transition temperature. The effect then resulting is, of course, an oscillation of the relaxation type. In view of the several points along block 10 at which the current must pass from the block 10 into or from members 12 and 14, more heat is obviously generated immediately adjacent to several points of each portion of superconductive material in the phase represented by line 50 of Fig. 5 than with prior art arrangements in which a continuous path through a superconductive member is merely paralleled by a continuous path through the non-superconductive material. This results in quicker heating of the members 12 and 14 when the voltage is sufficient to carry the combination above the transition temperature. Furthermore, the provision of a relatively large volume of an efficient heat transferring material immediately adjacent and surrounding the portions of the non-superconductive material through which the electric current passes insures a relatively rapid cooling of the heated portions as soon as the current flowing through the device is reduced as a result of the device passing above the transition temperature. Therefore the arrangement of Fig. 1 as described in detail above and the related arrangements of Figs. 3, 4 and 8A to be described in detail hereinunder can be caused to pass more rapidly from the first phase of line 50 through the phase of line 52 to the phase of line 56, 54 (Fig. 5) and vice versa, than prior art devices such as that described above.

Figure 3:
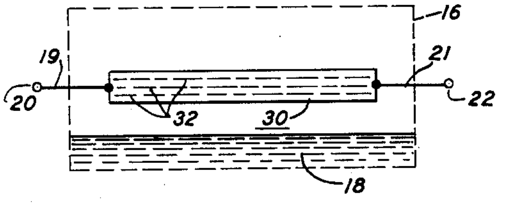
Fig. 3 illustrates a second device of the invention.
Figure 2:
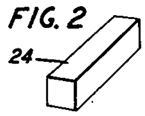
Fig. 2 illustrates a block of material from which a member for use in certain devices of the invention can be readily fabricated.

In Figs. 2 and 3, block 24 of Fig. 2 comprises a piece of a two-phase alloy such for example as copper lead bronze containing for example between 10 and 15 percent of lead. In such an alloy, as is well known to those skilled in the art, tiny droplets of the lead will separate out and be distributed in random fashion throughout the alloy. Block 24 is then, for the purposes of the present invention, drawn into an elongated member such as member 30 of Fig. 3. The lead droplets will as a result of the drawing operation become elongated filaments as represented by lines 32 distributed randomly throughout the member 30. In the majority of cases the lead filaments will be isolated from each other by intervening fibres of the other metals in the alloy (mainly copper in the proposed example) so that member 30 is, obviously, capable of functioning in much the same manner as described above for member 10 of Fig. 1 with members 12 and 14 attached thereto.

External terminals 20 and 22 are connected to the opposite extremities of member 30 by leads 19 and 21 as shown and the member 30 is enclosed in a Dewar flask 16 containing a quantity of liquid helium 18 as described in connection with Fig. 1.

Figure 4:
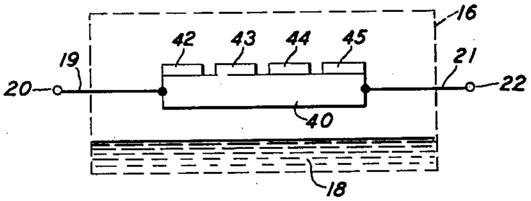
Fig. 4 illustrates a third device of the invention.

In Fig. 4 a device closely related to that of Fig. 1 is shown. It comprises a block 40 which is highly conductive to both heat and electricity but is devoid of the property of developing superconductivity within the range of temperatures with which the device is to be employed. Block 40 can be, for example, of copper. Small members 42 through 45, inclusive, are placed in spaced relation on the upper surface of block 40. The elements 42 through 45 may be strip material soldered or otherwise conductively affixed to bar 40 or they may be vapor deposited on bar 40 as described hereinabove for Fig. 1.

Elements 42 through 45 are of a material such, for example, as lead which is superconductive at and below a predetermined transition temperature so that the arrangement of Fig. 4 is obviously the equivalent of a plurality of the arrangements of Fig. 1 connected electrically in series and its operation is essentially the same as described in detail above for the arrangement of Fig. 1. In general, the arrangement of Fig. 4 would be preferable where the voltages to be employed are larger than can conveniently be employed with the arrangement of Fig. 1. Terminals 20 and 22 are connected by leads 19 and 21, respectively, to opposite extremities of block 40. The block 40 and members 42 through 45, inclusive, secured to block 40 are mounted in a Dewar flask 16 having a quantity of liquid helium 18 within it.

Figure 6:
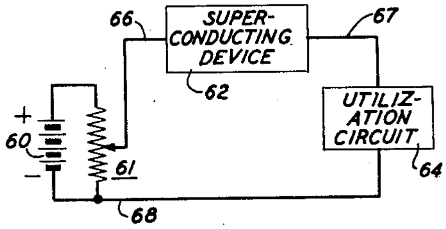
Fig. 6 is an illustrative diagram of a circuit employing a device of the invention.

In Fig. 6 a very simple circuit utilizing a device of the invention is illustrated diagrammatically by way of example. It comprises a battery 60 shunted by an adjustable potentiometer 61. Leads 66, 67 and 68 connect the series combination of utilization circuit 64 and device 62 of the invention across potentiometer 61, as shown. Device 62 can be, for example, one of the devices illustrated in Figs. 1, 3 and 4. This very simple circuit can be made to function as a relaxation type of oscillator circuit as follows. The voltage across potentiometer 61 is adjusted until the current through device 62 is sufficient to raise its temperature above the transition temperature when the constituent superconductive material is below its transition temperature but is insufficient to maintain the temperature above the transition temperature at which the constituent material of device 62 is superconductive. In other words, the current above the transition temperature produces less heat than is absorbed by conduction of the copper block and the cooling effect of the liquid helium in the Dewar flask. However, when the temperature of the device falls below the transition temperature the resistivity of the superconductive portions drop suddenly to zero and an appreciably larger current flows. This larger current while flowing produces sufficient heat in and adjacent to the superconductive portions of device 62 to again raise them above the transition temperature whereupon they become non-superconducting and the current returns to its lower value and the cycle is continuously repeated.

Figure 7:
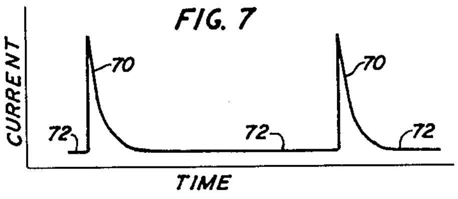
Fig. 7 is a curve illustrating operation of the circuit of Fig. 6.

A typical current versus time characteristic of such a relaxation oscillator circuit is illustrated in Fig. 7. With the device 62 above the transition temperature of its superconductive material, its resistivity is relatively high and a relatively small current flows as represented by portions 72 of the curve of Fig. 7. When the temperature is reduced to the transition temperature or below it, the resistance of the device 62 suddenly jumps to a low value and the current in the circuit suddenly jumps to a higher value as illustrated by the leading (left) edge of peaks 70 of Fig. 7. The heating effect of the larger current raises the temperature of the device to a value exceeding the transition temperature and the current drops back along the trailing (right) edge of peaks 70 to the low value of portions 72. This cycle is repeated to provide a succession of current pulses 70 in the utilization circuit. Adjustment of potentiometer 61 within the range over which oscillation is sustained will obviously change the frequency and breadth of the pulses 70. Subdivision of the superconductive material into portions not directly in contact with each other but intimately associated at a plurality of points with portions of the non-superconductive material which electrically interconnect the superconductive portions, as taught in this application, and the provision of a suitable heat sink accelerate the heating and cooling cycles so that arrangements of the invention can produce higher frequency oscillations than comparable prior art arrangements.

Figure 8A:
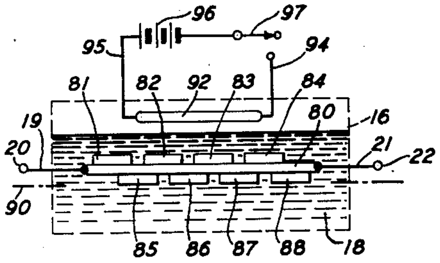
Figs. 8A and 8B illustrate a still further device of the invention.
Figure 8B:
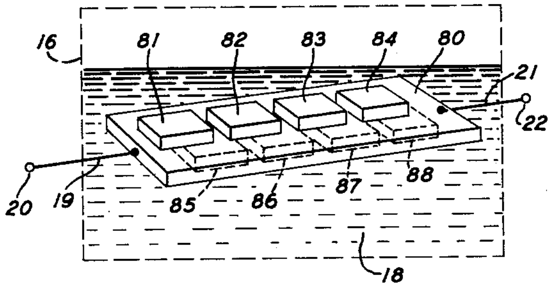

In Figs. 8A and 8B, a side and a perspective view, respectively, are shown of a further arrangement of the invention. This arrangement comprises a larger member 80 which can be, for example, of sheet or ribbon copper or other conductive material which is an efficient conductor of both heat and electricity but does not become superconductive and a plurality of smaller members 81 through 88, inclusive, spaced from each other along member 80. Members 81 through 88, inclusive, can be substantially identical and are of a material which does become superconductive at a predetermined transition temperature. They are soldered or otherwise conductively affixed to member 80. Members 81 through 84, inclusive, are attached to the upper surface of member 80 and members 85 through 88, inclusive, are attached to the lower surface. The two rows are preferably staggered with respect to each other, as shown, for reasons which will presently become apparent. Member 80, as shown more clearly in Fig. 8B, can advantageously have larger major faces than are required for mounting the superconductive elements. The assembly in this case can preferably be immersed in the liquid helium 18 so that the liquid helium serves as a heat sink of appreciable capacity and member 80, accordingly, can be of relatively thin sheet metal.

Alternatively, the level of the liquid helium 18 can be maintained so as to just make contact with members 85 through 88 as indicated by broken line 90 of Fig. 8A. In such a situation the members 85 through 88 attached to the lower surface of member 80 will be first cooled to the transition temperature at which they become superconductive causing a sudden substantial drop in the resistance between terminals 20 and 22. A short interval later the members 81 through 84, inclusive, will become cooled to the transition temperature and a further sudden drop in the resistance between terminals 20 and 22 will take place. The reverse of the above-described cycle will of course result if a sufficient voltage is impressed across terminals 20, 22. Thus two discontinuities in the resistance or voltage drop across the terminals 20, 22 can be provided by the arrangement of Figs. 8A and 8B instead of only one as the temperature is raised or lowered through the transition temperature.

To produce a more marked pair of discontinuities for each cooling or heating process, one group of the superconductive members, for example members 81 through 84, inclusive, can, for example, be of lead having a transition temperature of 7.22 degrees Kelvin at which superconductivity occurs and the other row of members, for example members 85 through 88, inclusive, can be of niobium nitride having a transition temperature of 15.7 degrees Kelvin. (Alternatively, by way of further example, the superconducting members at one end of plate 80, for example 81, 82, 85 and 86, can be of lead and the remainder at the other end can be of niobium nitride.)

Obviously, also, superconducting members of three or more materials all having transition temperatures differing appreciably from each other can be assembled on plate 80 so that substantial jumps in the resistance between terminals 20, 22 of plate 80 will occur at three or more temperatures as the temperature is decreased or increased through a range including all of the transition temperatures.

Such devices could, for example, be of use in indicating the magnitudes of unknown applied voltages. More specifically, a voltage exceeding a first predetermined value would provide sufficient heat to the assembly so that it could not be cooled by its normal cooling means to even the highest transition temperature, a somewhat lower range of voltages would permit cooling below the highest transition temperature but prevent cooling to the next transition temperature, a still lower range of voltages would permit cooling below the two higher transition temperatures but not the next lower and so on. The frequency at which the combination cycled through one or more of the transition temperatures would permit calibration in each range of voltages to indicate the position of a specific voltage within its appropriate range. Alternating voltages of significantly differing frequencies would also produce distinctive reactions in such a device. Obviously, also, each of such devices could store any one of a plurality of information bits.

Members of several superconductive materials having distinctly different transition temperatures mounted on a single member of non-superconducting material can also, obviously, be equally well furnished in the forms illustrated by the simpler structures shown in Figs. 1 and 4.

As a still further combination of the invention, the member 80 of Figs. 8A and 8B can be of a superconductive material having a relatively low transition temperature, for example, it can be of white tin having a transition temperature of 3.69 degrees Kelvin and members 81 through 88 can be of a superconductive material or of several different superconductive materials, respectively, having a higher transition temperature or several higher transition temperatures, respectively. (See, for example, Tables 11.1 and 11.2 of the above-mentioned Kittel book.) Such a device would have a resistance decreasing by abrupt jumps as the temperature was cooled through each of the transition temperatures of the several component materials and would ultimately have zero resistance when the transition temperature of member 80 was reached. If such a device is to be operated under conditions such that its temperature is reduced to or below the transition temperature of the plate 80, it is then preferable that a separate heating means such as heating unit 92, Fig. 8A, with a power source 96 connecting through leads 94 and 95 and controlled by a switch 97 be provided to assist in raising the temperature of the superconductive members so that repeated cycles of heating and cooling can be effected. Automatic means for closing switch 97 (not shown) can readily be devised by those skilled in the art to apply power to heating means 92 whenever the current through plate 80 has increased to a value corresponding to its superconductive state and to reopen switch 97 when the current through plate 80 has been reduced to a second predetermined value.

Numerous and varied other arrangements and modifications of the above-described representative arrangements clearly within the spirit and scope of the invention will readily occur to those skilled in the art.

What is claimed is:

1. In combination, a first member conductive to both heat and electricity, the first member being of a material which does not become superconductive, a plurality of other members, the other members being of a material which is superconductive at and below a predetermined transition temperature, the plurality of other members being spaced along the first member in intimate electrical and heat transfer contact with the first member and electrically interconnected with each other through the first member only, means for cooling the combination to a temperature of at least the predetermined transition temperature, and means for electrically connecting to the ends of the first member.

2. In combination, a first electrically conductive member which does not become superconductive, a plurality of members the resistivity of which becomes zero at and below a predetermined transition temperature, each of the plurality of members electrically shunting a portion only along the first member, the plurality of members being electrically connected to each other through the first member only, means for cooling all of the members to a temperature at least as low as the predetermined transition temperature, an electrical power source, means for adjusting the power supplied by the source, a utilization means, and means electrically connecting the power source and utilization means in series with the first member.

3. The combination of claim 2 in which the power supplied from the source to the first member is sufficient to raise the temperature of all the members above the predetermined transition temperature when the members are at or below the transition temperature but insufficient to prevent subsequent cooling of the members to a temperature at least as low as the predetermined transition temperature when the members are at a temperature higher than the transition temperature.

4. The combination of claim 2 in which the mass of the first member is sufficient to act as an efficient heat sink to rapidly disperse heat localized in and near the plurality of members which become superconductive.

5. The combination of claim 1 in which the mass of the first member is greater than the combined mass of the members which become superconductive.

6. The combination of claim 1 in which the first member has a surface area greater than the combined surface areas of the members which become superconductive.

7. In combination, a first electrically conductive member which does not become superconductive, a first plurality of members of a material which becomes superconductive at a first predetermined transition temperature the plurality of members being spaced from each other along a first portion of the first member in electrical and heat conducting contact with the first member, a second plurality of members of a material which becomes superconductive at a second predetermined transition temperature, the second plurality of members being spaced from each other and from the first plurality of members along a second portion of the first member in electrical and heat conducting contact with the first member, means for cooling the combination to at least the lower of the predetermined transition temperatures, and means for electrically connecting to the extremities of the first member.

8. In combination, a first electrically conductive member which does not become superconductive, a first plurality of members and a second plurality of members, the pluralities of members being of a material which becomes superconducting at a predetermined transition temperature, the first plurality of members being mounted in spaced relation on one major surface of said first member in close electrical and heat conducting relation with said first member only, the second plurality of members being similarly mounted on the opposite major surface of the first member, means for cooling the combination to at least the transition temperature, the last stated means including a localized refrigerant and means for supporting the first member with one of the major surfaces facing the refrigerant.

9. In combination, a first electrically conductive member which does not become superconductive, a second member which becomes superconductive at a first predetermined transition temperature, a third member which becomes superconductive at a second predetermined transition temperature, said second and third members being mounted on the first member and being electrically interconnected through the first member only, means for cooling the members to a temperature at least as low as the lower of the transition temperatures, and means for connecting electrically to the extremities of the first member.

10. The combination of claim 9 in which the area of the first member substantially exceeds the combined total areas of the other members.

11. The combination of claim 9 in which the volume of the first member substantially exceeds the combined volumes of the other members.

12. In combination, a first member of a first superconductive material, a first plurality of members of a second superconductive material and a second plurality of members of a third superconductive material, the pluralities of members being distributed along the first member in intimate electrical and heat transfer relation with the first member but interconnected electrically with each other through the first member only, the transition temperatures of the second and third materials being higher than that of the first material and differing appreciably from each other, means for cooling the combination to at least the transition temperature of the first member, independent switch-controlled means for applying heat to the combination, and means for electrically connecting to the extremities of the first member.

No references cited.